(12) United States Patent
Batke et al.

(10) Patent No.: US 8,555,373 B2
(45) Date of Patent: Oct. 8, 2013

(54) NETWORK SECURITY MODULE FOR ETHERNET-RECEIVING INDUSTRIAL CONTROL DEVICES

(75) Inventors: Brian A. Batke, Novelty, OH (US); Sivaram Balasubramanian, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1156 days.

(21) Appl. No.: 12/031,288

(22) Filed: Feb. 14, 2008

(65) Prior Publication Data

US 2010/0031340 A1   Feb. 4, 2010

(51) Int. Cl.
*G06F 15/16* (2006.01)
*G06F 11/30* (2006.01)
*H04J 3/06* (2006.01)
*H04J 7/00* (2006.01)

(52) U.S. Cl.
USPC ............... 726/13; 726/14; 370/509; 375/356; 713/183; 713/192

(58) Field of Classification Search
USPC ................ 713/155–159, 187–188, 193–194; 709/206, 229
See application file for complete search history.

(56) References Cited

U.S. PATENT DOCUMENTS

| | | | |
|---|---|---|---|
| 2006/0085839 A1 | 4/2006 | Brandt et al. | |
| 2006/0155865 A1 | 7/2006 | Brandt et al. | |
| 2006/0245454 A1* | 11/2006 | Balasubramanian et al. | 370/509 |
| 2007/0038677 A1* | 2/2007 | Reasor et al. | 707/200 |
| 2008/0282339 A1* | 11/2008 | Nakae et al. | 726/13 |
| 2009/0210701 A1* | 8/2009 | Zhang et al. | 713/156 |

* cited by examiner

*Primary Examiner* — Evans Desrosiers
(74) *Attorney, Agent, or Firm* — R. Scott Speroff; Boyle Fredrickson, S.C.; John M. Miller

(57) ABSTRACT

A high-speed security device for network connected industrial controls provides hybrid processing in tandem hardware and software security components. The software security component establishes state-less data identifying each packet that requires high-speed processing and loads a data table in the hardware component. The hardware component may then allow packets matching data of the data table to bypass the software component while passing other non-matching packets to the software component for more sophisticated state analysis.

17 Claims, 3 Drawing Sheets

NETWORK SECURITY MODULE FOR ETHERNET-RECEIVING INDUSTRIAL CONTROL DEVICES

CROSS-REFERENCE TO RELATED APPLICATIONS

--

STATEMENT REGARDING FEDERALLY SPONSORED RESEARCH OR DEVELOPMENT

--

BACKGROUND OF THE INVENTION

The present invention relates generally to industrial controllers for controlling machines and industrial processes, and, in particular, to a security module allowing greater security for industrial control devices interconnected using common Ethernet networks.

Industrial controllers are used to control and monitor industrial processes and machinery. A typical industrial controller includes a special-purpose computer that executes a stored control program to read inputs from and provide outputs to the controlled process, based on the logic of the control program.

Industrial controllers differ from conventional computers in three respects. First, industrial controllers are highly customizable to fit the demands of the particular industrial process being controlled. Typically, this customization is made possible by a modular construction which provides different components that may be added to the industrial controller to expand it for a particular application. Most typically, these additional components will be I/O (input/output) modules that provide analog or digital signals to actuators or that receive analog or digital signals from sensors. Other common components include displays and motor drives.

The second difference between industrial controllers and conventional computers is that the components of the industrial controller can be separated by considerable distances, for example, as distributed over a network communicating throughout a factory. A number of proprietary high-speed control networks are used for this purpose including, for example, ControlNet and DeviceNet, open standards managed by a multi-industry consortium ODVA (www.odva.org).

Third, industrial controllers, unlike conventional computers, must provide highly predictable and reliable control outputs that may safely control physical equipment. In this regard, it is imperative both that the outputs and inputs be delivered rapidly and that there be assurance that the outputs and inputs have, in fact, been communicated. Corruption of the data communication or spurious messages cannot be allowed.

Recently there has been considerable interest in control networks that use the Ethernet protocol. Such networks make use of readily available and low-cost Ethernet hardware and add an additional protocol to provide for the other requirements of the control network. Such control network protocols include EtherNet/IP, (Ethernet Industrial Protocol), an open standard also managed by ODVA, and Modbus/TCP and others.

The use of an Ethernet compatible network allows the control system to use a network that is also connected to other non-control computers and even to the Internet. Such connections raise the risk of familiar Internet security problems arising from malicious traffic. Such malicious traffic can wreak greater damage in an industrial control environment than in a standard computing environment where equipment is not being controlled. Accordingly such malicious traffic must be prevented.

A standard method of limiting the effects of malicious network traffic is the use of a firewall and/or a security protocol. A simple firewall examines packets moving over the Ethernet to reject certain packets based on state-less data gleaned from individual packets, for example, data indicating the source of the packet or the port to which the packet is directed. More sophisticated firewalls, however, extract state data from multiple packets to better characterize the packets (for example in the context of the communications protocol) and reject those packets deemed harmful. These more advanced firewalls employ an electronic computer executing software to logically process the state information developed from the multiple packets and to assess whether the packet should be forwarded or blocked at the firewall.

As an alternative, or in addition to a firewall, a security protocol may be executed by devices communicating on the network, with the devices exchanging information so as to establish, for example, the authenticity of the transmitting device. An example security protocol is that used to implement a secure HTTP (https).

Desirably, in the industrial control environment, each control device would have a firewall and/or security protocol blocking harmful traffic from a connected Ethernet network. This may, however, be impractical for legacy devices or simple devices that cannot support the cost or processing power needed for implementation of these functions. Further, sophisticated Internet firewalls or security protocols may introduce a communication delay and variations in delay (jitter) that are unacceptable for high-speed control signals in a control environment.

SUMMARY OF THE INVENTION

The present invention provides a high-speed network security module suitable for use in industrial control environments wherein the security task is divided between a high-speed hardware component and a slower but more sophisticated software component. The software component may communicate with the hardware component to develop an "allow list" or "reject list" on state data extracted from the packets by the software component. The allow and reject list is used by the hardware component to quickly evaluate packets allowing known, high-speed packets to pass without further delay. Other packets are passed to the software component to be evaluated and either allowed or rejected. In this way high-speed traffic may be quickly passed by the hardware component, as updated by the software component, while sophisticated state analysis of packets can be performed by the software component. The software component may, alternatively or in addition, execute a security protocol and add authenticated packets to the authorization list.

Specifically then, the present invention provides a network tap increasing the security of an industrial control system. The network tap provides a first port connectable to a network carrying industrial control data employing an industrial control protocol, and a second port connectable to a control device communicating with an industrial process for control thereof. A hardware security component receives data packets and extracts packet data from the network packets to compare with an allow list in a data table. The hardware security component then passes the network packets to the second port if the packet data is in the allow list and otherwise passes the packet to a software security component.

The software security component includes an electronic computer executing a stored program to receive packets and extract state data from multiple packets according to the industrial control protocol. The software security component further (1) identifies objectionable packets and rejects those objectionable packets without transmitting them to the second port; (2) identifies allowable first control data packets requiring high speed processing to allow those first control data packets to pass to the second port and to load packet data into the allow list identifying future similar first control packets for the hardware component; and (3) identifies allowable second data packets not requiring high speed processing to allow those second packets to pass to the second port without loading packet data into the allow list.

It is thus one object of one embodiment of the invention to provide an extremely high speed firewall or security proxy for industrial control applications that nevertheless can respond in a sophisticated manner to state data from the packets indicating the significance of the packet within the control protocol, for example, as a high-speed control packet.

The first control packets are input/output data used to control the industrial process in real time.

It is thus an object of an embodiment of the invention to provide security for real-time control data.

The packet data may include a connection number identifying the packet to a pre-configured connection between pre-identified hardware components communicating on the network.

It is therefore an object of one embodiment of the invention to provide a system that may work with connected communications systems used for industrial control and to use the connection identification to allow fast vetting of control packets.

The packet data includes a source address indicating source of the packet.

One object of at least one embodiment of the invention is to allow conventional source packet filtering provided by firewalls.

The hardware security component is fabricated as at least one of a field programmable gate array and application specific integrated circuit.

It is an object of one embodiment of the invention to provide extremely fast packet filtering through the use of a dedicated hardware circuit.

The second port is a network port connected to a network receiving control device.

It is therefore one object of one embodiment of the invention to provide a system that may work with legacy devices and devices that have limited computational resources.

The second port is an internal communication bus in the control device incorporating the network tap and wherein the electronic computer is also used for operation of the control device.

It is thus one object of one embodiment of the invention to provide a device that can share existing computation resources with the control device The software security component may execute a security protocol with a correspondent device communicating on the first port to identify an authenticated connection and it is thus one object of one embodiment of the invention to provide an encryption key to the hardware security component, and wherein the hardware security component may extract a security key from packets decrypted with the security key and compared with allow list.

Another object of some embodiments of the invention is to manage a security protocol initially with a software component capable of sophisticated state processing while then off-loading the enforcement of the security protocol onto a hardware circuit.

These particular objects and advantages may apply to only some embodiments falling within the claims and thus do not define the scope of the invention.

DETAILED DESCRIPTION OF THE PREFERRED EMBODIMENT

Figure 1:
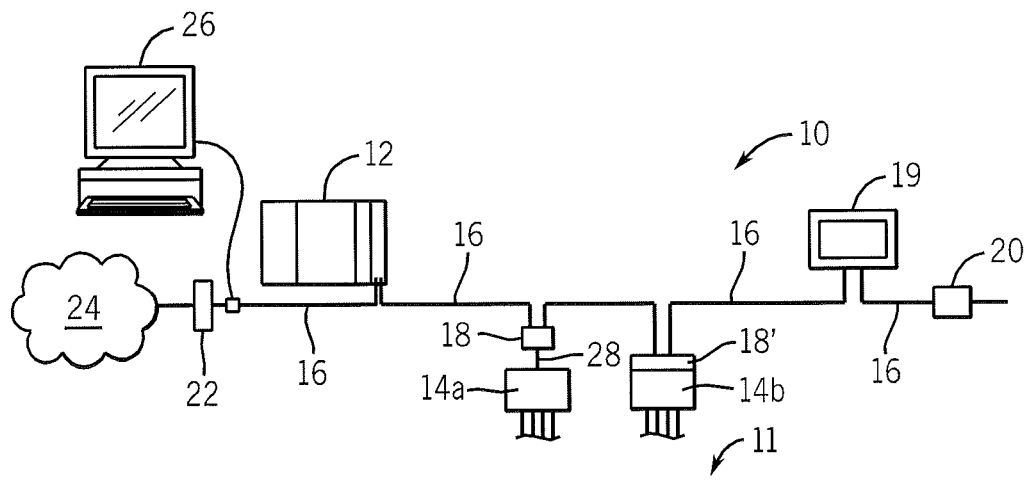
FIG. 1 is a block diagram showing elements of an example industrial control system connected using an Ethernet network and using the invention both as a freestanding device and embedded into a control device.

Referring now to FIG. 1, an industrial control system 10 suitable for providing real-time control of an industrial process 11 may include, for example, a central controller 12 executing a stored program to control the industrial process 11 through the agency of one or more input/output (I/O) modules 14a and 14b.

The central controller 12 may communicate with the I/O modules 14a and 14b by means of an network 16 of the type well known in the art. For the purpose of the following description it will be assumed that the network 16 is an Ethernet network such it is currently commonly used in this art, supporting an Ethernet compatible industrial control protocol such as EtherNet/IP or Modbus/TCP may be layered onto the Ethernet protocol. It should be understood however, that the present invention need not be limited to such Ethernet networks.

The Ethernet network may also communicate with other control devices, for example, a human machine interface (HMI) 19, a bridge 20 to other networks, an Internet gateway 22 leading to the Internet 24, and an operator terminal 26 providing operator control and programs to the central controller 12.

Connection of the Ethernet network 16 to the Internet 24 brings with it the risk of malicious traffic which may be blocked by a firewall 18 connected to the Ethernet network 16 and communicating with the I/O module 14a via a short Ethernet stub 28. Alternatively a firewall 18', may be incorporated into the I/O module 14b to communicate therewith it through an internal bus structure to be described.

Figure 2:
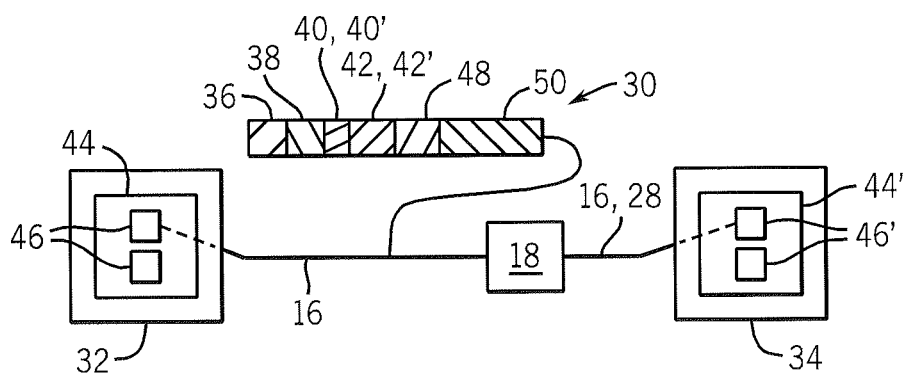
FIG. 2 is a simplified representation of an Ethernet packet as may be communicated between a source and destination device.

Referring now to FIG. 2, generally, the Ethernet network 16 permits communication of multiple packets 30 between a source device 32 and a destination device 34. As is generally understood in the art, the packet 30 may include multiple protocol elements that logically provide a source identifier 36 identifying the source device 32 of the packet. Optionally a source service field 40 and source object field 42 may identify a software service 44 and one or more software objects 46 within the source device 32 for even finer scale granularity in communication. Additionally the packet may include a destination field 38 identifying the destination device 34. Optionally a destination service field 40' and destination object field 42' may identify a software service 44, and a software object 46, within the destination device 34.

In order to achieve end-to-end communications between application programs, higher level protocols are typically layered on Ethernet. Examples in the standard TCP/IP suite are FTP, HTTP, etc. For industrial communications, specific protocols have been designed to be optimized for industrial communication such as EtherNet/IP, Modbus/TCP Such industrial control protocols may allow, for example, for "connected messaging" in which the network and end device resources are pre-allocated to particular "connections", for example, by pre-allocating buffer memory for the packets 30 and network bandwidth sufficient to ensure reliable and predictable communication. Each connection is established by means of a connection dialog in which messages are traded between the source device 32 and destination device 34 to make this allocation. When the connection is complete, the connection is assigned a connection identification 48 which is also embedded within the packet 30.

Finally, the packet 30 also includes data 50 intended for the transmission, for example, the values of various points of I/O data.

Each of these fields 36, 38, 40, 40', 42, 42' and 48 is "state-less" data meaning that it may be interpreted from a single packet 30 without reference to states established by earlier or later packets 30.

Figure 3:
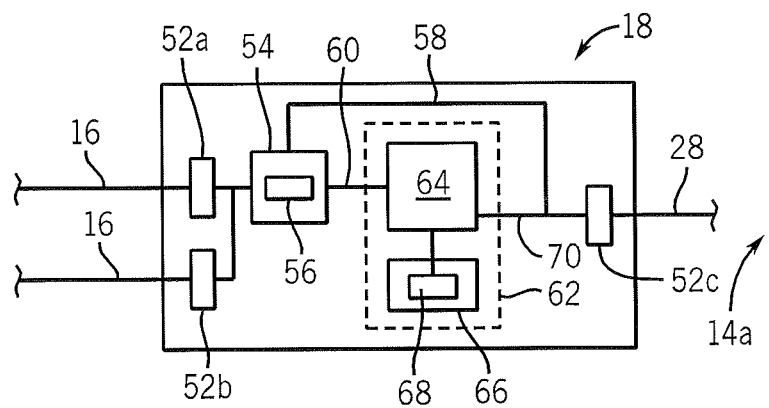
FIG. 3 is a block diagram of the freestanding version of the invention shown in FIG. 1 illustrating the cooperating hardware and software security elements.

Referring now to FIG. 3, the firewall 18 (or 18') of the present invention may provide for multiple ports 52a, 52b, and 52c. The first and second ports, 52a and 52b, are connected to media of the Ethernet network 16. For firewall 18, port 52c is connected to an Ethernet stub 28 leading only to the associated I/O module 14a. It will be understood, henceforth, that the I/O modules 14 are described here only as an example and that the invention is not limited to use with I/O modules.

The ports 52a, 52b, and 52c provide for a low-level interface to the Ethernet media and manage timing, voltage levels, and collision detection and response, as is understood in the art. Port 52a communicates directly with port 52b to pass data therebetween without modification in the manner of an embedded switch.

The data of both ports 52a and 52b maybe monitored by a hardware security component 54 having a data table 56 holding static information in an "allow list" matching one or more of the fields 36, 38, 40, 42 and 48 of a packet 30. The hardware security component 54 provides a physical connection 58 to the port 52c so that packets may be transmitted directly from the hardware security component 54 to that port 52c. Alternatively the hardware security component 54 may pass a packet via connection 60 to software security component 62.

The software security component includes a processor 64 communicating with a memory 66, the latter holding a stored firewall program 68. The processor 64 may communicate via a connection 70 with the port 52c to pass packets thereto and ultimately to I/O module 14a.

Figure 4:
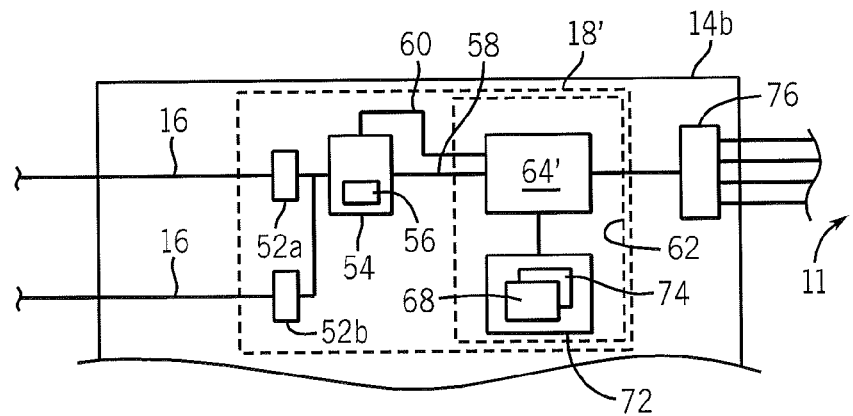
FIG. 4 is a figure similar to that of FIG. 3 showing the embedded version of the invention of FIG. 1.

Referring now to FIG. 4, in an alternative embodiment, the firewall 18 may be incorporated into the I/O module 14b and may share a processor 64' used for control of the I/O module 14b and the firewall 18. In this regard, the processor 64' may communicate with a memory 72 holding both the firewall program 68 and an I/O module operating program 74. In this case, the processor 64' connects with I/O interface circuits 76 communicating directly with the industrial process 11 to send data to actuators controlling that process and receive data from sensors attached to that process.

In this embodiment, the logical connections 60 and 58 from the hardware security both connect to the processor 64', the logical connection 60 communicating with the processor 64' first in its capacity as part of the firewall 18 executing firewall program 68, the logical connection 58 communicating with the processor 64' in its capacity as controller of the I/O module 14b executing I/O module operating program 74.

Figure 5:
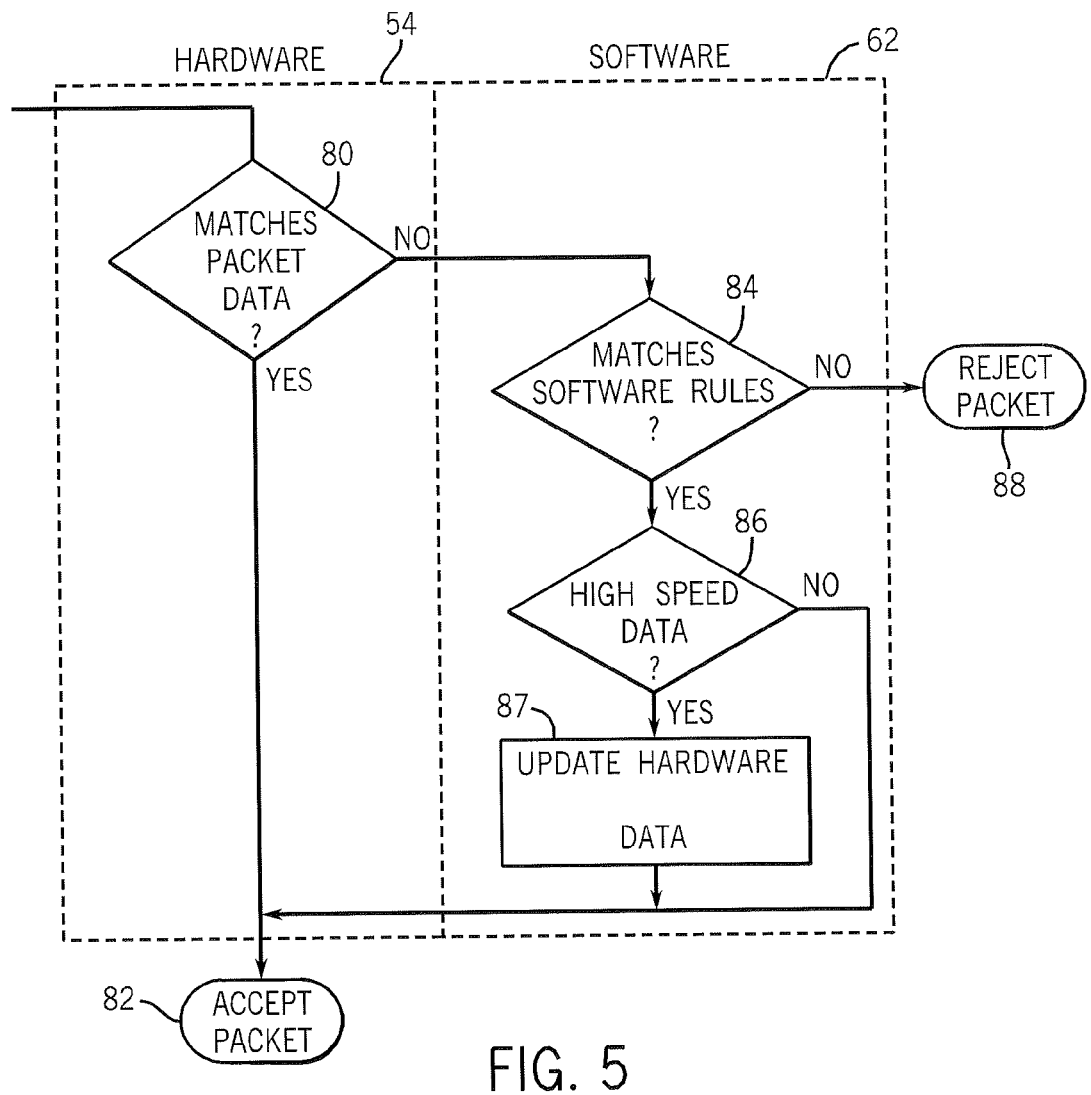
FIG. 5 is a flow chart showing the steps of the present invention executed in both the hardware and software security elements for a simple firewall implementation.

Referring now to FIG. 5 in both embodiments of FIGS. 3 and 4, the hardware security component 54 and the software security component 62 operate in tandem to provide for efficient firewall processing of high-speed control data. As indicated by decision block 80, initially packets 30 are received by the hardware security component 54 which extracts stateless data from each packet 30 and attempts to match this state-less data with corresponding data in an allow list in data table 56. More complex, "state data" may also be used requiring knowledge of the context of the packet among other packets in a protocol. Initially data table 56 will have no data and no match can be made; however, as will be described below, the allow list will be updated so that in certain cases there will be a match. In the event of a match, the hardware security component 54 allows the packet to pass to the I/O module 14 as indicated by process block 82.

The hardware security component 54, for example, may be a field programmable gate array (FPGA) or an application specific integrated circuit (ASIC) and thus may perform this state-less processing with speed sufficient to keep up with high-speed control data. The execution of decision block 80 is thus performed by dedicated circuitry rather than by a general-purpose processor.

If there is no match between the state-less data of the packet 30 and the allow list of table 56, the packet will be passed to the software security component 62 as indicated by decision block 84. At decision block 84, software security component 62 determines whether the packet rejected by the hardware security component 54 satisfies a set of software-based rules in the firewall program 68 intended to block malware or other spurious packets. The firewall program 68, in its simplest case, provides a packet filter which compares each packet against a "blacklist" or "whitelist", as is known in the art, that may be more extensive than the acceptance table in the data table 56 used by the hardware security component 54, the latter, used by hardware, which will be simpler. Preferably, however, the firewall program 68 implements a complex state analysis of the packet 30 in which the data of the packet is considered as well as data of previous packets in light of knowledge of a particular protocol being executed. Thus the software security component 62 may consider not simply the state-less data of fields 36, 38, 40, 42, and 48 but may consider the meaning of the packet in the protocol as may be established by a sequence of packets. To the extent that the firewall program 68 executes on a general-purpose processor 64, the particular rules can be readily modified.

If at decision block 84, the packet does not pass the sophisticated rule set of decision block 84, it is rejected as indicated by process block 88.

The software security component 62 may identify not only "safe" packets (at decision block 84) but packets that require high speed processing as marked by the industrial control protocol (per decision block 86). Specifically, in the event that the decision block 84 determines that the packet is acceptable, the firewall program 68 moves to decision block 86 and it is determined whether the particular data being processed in a packet is part of data that would be considered high speed data where rapid transmission is required. Again this may be a complex state analysis of multiple packets that may, for example, monitor the packets associated with the opening of a connection that will be associated with such high-speed data.

If the packet is approved by decision block 84 but is not high speed data (per decision block 86) the packet is directly approved per process block 82.

If the packet is high speed data per decision block 86, the firewall program 68 proceeds to process block 87 and stateless data of the approved high speed packet is extracted such as may form a "fingerprint" identifying the packet without a state analysis. This fingerprint data is then loaded into the table 56 of the hardware component as part of the acceptance list, so that in the future, at decision block 80, similar packets may be passed directly by the hardware security component 54 without intervention of the software security component 62.

At the conclusion of this updating per process block 87, the packet may again be accepted as indicated by process block 82.

The rules of the firewall program 68 may be flexibly implemented and reprogrammed but their execution will be much slower than the execution of the hardware security component 54 and thus may not be suitable for processing of high-speed I/O data using practically available processors. As noted before, a wide variety of different firewall programs 68 may be adopted without changing this hardware security component 54, as changes in firewall programs 68 as implemented in the hardware security component 54 require only changes in the data of the table 56.

Figure 6:
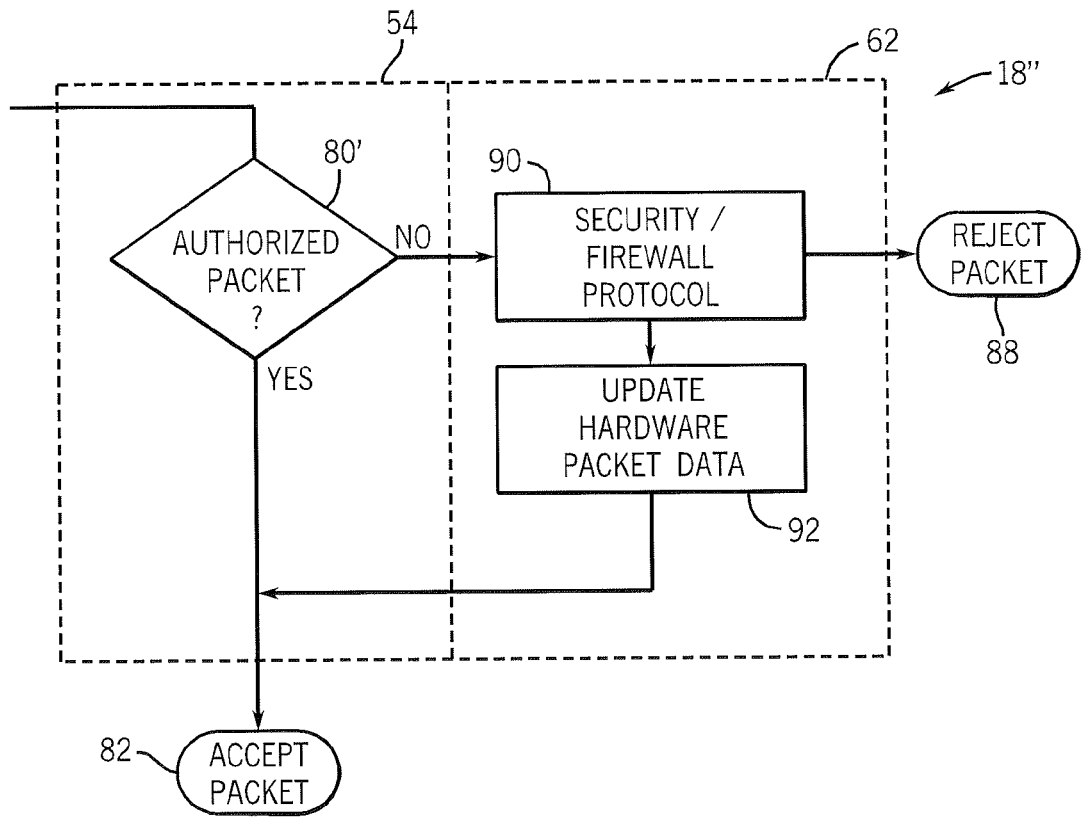
FIG. 6 is a figure similar to that of FIG. 5 showing the steps executed in both the hardware and software security elements for a simple security proxy implementation.
Figure 7:
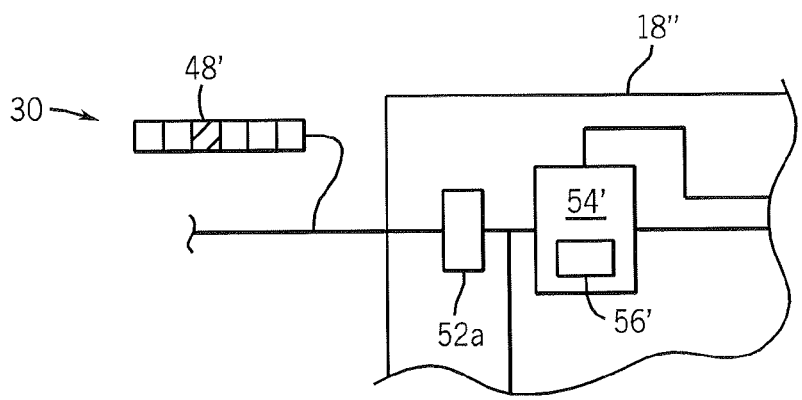
FIG. 7 is a figure similar to that of FIGS. 3 and 4 showing the packet and hardware table for the security proxy of FIG. 6.

Referring now to FIGS. 6 and 7, this same system may be used to create a security proxy 18" in which a secure version of the industrial protocol is used to prevent unauthorized communications, whether malicious or inadvertent. The secure protocol preferably establishes a secure communication session or association (involving authentication of the message source and/or destination according to methods well-known in the art), and then secures transmission of messages over the secure session. Under the secure protocol messages must be checked for the proper authorization to perform the requested function.

The software security component 62 is responsible for the initial secure session establishment function, which involves authenticating the originating device or user. The software security component 62 may initiate a secure session when the software security component 62 is associated with the originating device, or may cooperate with another originating device in creating the secure session. The security protocol provides communications between the source device 32 and destination device 34 necessary to "authenticate" packets. This authentication can, for example, confirm device serial numbers (established by other means) or other device characteristics, typically during the connection process, to verify the parties to the communication.

The result of establishing a secure session will be the generation of security credentials such as a secure tokens, passwords, etc., henceforth all referred to as "keys" that identify and/or authenticate secure packets. Once the secure session is established, subsequent messages are sent over the secure session typically with some form of encryption of either all or part of the message whose decryption requires the key.

Because encryption and decryption is resource-intensive, the assistance of a hardware component 54 can greatly improve the communication performance. As part of the secure session establishment, the software component 62 loads the hardware security component 54 with the keys needed to authenticate the incoming messages and create encrypted outgoing secure messages. The hardware component 54 may then handle the encryption and decryption necessary.

In this case where the network tap is receiving packets under a secure protocol, the packets are received by the hardware security component 54 which analyzes them at decision block 80', corresponding generally to decision block 80, to determine whether the packets represent preauthorized secure packets. Such preauthorized secure packets will contain data indicating they are secure, typically by means all of an encryption key which may use for decryption of other packet data by the hardware security component 54. In this case, the data table 56' of the hardware security component 54' may contain both connection identifications (described earlier and identifying secure packets) and the key as described which authenticates the secure packets by decryption. Other identifying packet data may also be contained in table 56 including source and destination information.

If a given packet is authorized as established by data in the data table 56' (pre-loaded by the software security component 62) the hardware security component 54' proceeds to accept it at process block 82 as has been described. If the given packet is not authorized, the packet is passed to the software security component 62 where the packet may be rejected or, at process block 90, the execution of a security protocol may be implemented as described above.

In this case where the network tap is originating packets under a secure protocol, the packets are received by the hardware security component 54 (for example from an application program) and the hardware security component 54 encrypts them according to a key previously developed by the software security component 62 when the secure protocol was established. The hardware security component 54 stores this key and other information allowing it to identify a connection relating to the security protocol (for example a session ID) so that it may independently handle the lower levels of the security protocol including the necessary encryption. The packet is then sent out on the network.

The present invention has been described in terms of the preferred embodiment, and it is recognized that equivalents, alternatives, and modifications, aside from those expressly stated, are possible and within the scope of the appending claims.

We claim:

1. A network device configured to provide security for an industrial control system, the network device comprising:
   a first port connectable to a network carrying industrial control data employing an industrial control protocol;
   a second port connectable to a control device communicating with an industrial process for control thereof;
   a hardware security component configured to communicate with the first and second port, receive network packets, and extract packet identifying data from the network packets to compare with an allow list in a data table, the hardware security component configured to pass the network packets to the second port when the extracted packet-identifying data is in the allow list and otherwise configured to pass the network packet to a software security component; and
   the software security component executing separately from the hardware component and configured to communicate with, the second port and the hardware security component, the software security component comprising an electronic computer configured to execute a stored program to receive network packets passed from the hardware security component and extract state data from multiple network packets according to the industrial control protocol to:
identify objectionable network packets passed from the hardware security component;
reject the objectionable network packets without transmitting them to the second port;
identify allowable network packets passed from the hardware security component;
identify which of the allowable network packets require high speed processing;
obtain packet-identifying data from the allowable network packets requiring the high speed processing;
load the packet-identifying data into the allow list; and
pass the allowable network packets to the second port without further intervention by the hardware security component.

2. The network device of claim 1 including multiple connectors communicating with the first port to allow a linear network topology.

3. The network device of claim 1 wherein the network packets are input or output data used to control the industrial process in real time.

4. The network device of claim 1 wherein the packet identifying data includes a connection number identifying the network packet to a preconfigured connection between pre-identified hardware components communicating on the network.

5. The network device of claim 4 wherein the packet-identifying data is selected from the group consisting of: a source address indicating the source of the network packet, a port number indicating the logical port at which the network packet is received, and a connection identification number assigned to the communication connection.

6. The network device of claim 1 wherein the hardware security component is fabricated as at least one of a field programmable gate array and an application specific integrated circuit.

7. The network device of claim 1 wherein the second port is a network port connected via network medium to a network receiving input of the control device.

8. The network device of claim 1 wherein the second port is an internal communication bus in the control device incorporating the network device and wherein the electronic computer is also used for operation of the control device.

9. The network device of claim 1 wherein the software security component executes a security protocol with a device communicating on the first port to identify an authenticated connection and to provide an encryption key to the hardware security component, and wherein the hardware security component extracts a security key from network packets decrypted with the encryption key that is compared with the allow list.

10. A network device configured to provide security for an industrial control system, the network device comprising:
a first port connectable to a network carrying industrial control data employing an industrial control protocol;
a second port connectable to a control device communicating with an industrial process for control thereof;
a hardware security component being at least one of a field programmable gate array and an application specific integrated circuit, the hardware security component configured to communicate with the first and second port, receive encrypted network packets, review a data table to determine when a decryption key is available when the decryption key is available decrypt the packets and pass the packets to the second port and, when the decryption key is not available pass the packets to a software security component; and
the software security component executing separately from the hardware security component and configured to communicate with the hardware security component, the software security component comprising an electronic computer configured to execute a stored program to receive encrypted network packets from the hardware security component and extract state data from multiple network packets according to the industrial control protocol to:
execute a security protocol with a correspondent device communicating on the first port to authenticate the device on the first port;
share a security code with the correspondent device; and
load the security code in a data table.

11. The network device of claim 10 wherein the security code is an encryption key and wherein the data table also includes information identifying the correspondent device, and wherein the hardware security component uses the encryption key to extract the information identifying the correspondent device from a network packet received from the correspondent device.

12. The network device of claim 11 wherein the information identifying the correspondent device is a connection number identifying the packet to a pre-configured connection between pre-identified hardware components communicating on the network.

13. The network device of claim 11 wherein the information identifying the correspondent device is a source address indicating source of the network packet.

14. The network device of claim 10 wherein the second port is a network port connected via network medium to a network receiving input of a control device.

15. The network device of claim 10 wherein the second port is an internal communication bus in the control device incorporating the network device and wherein the electronic computer is also used for operation of the control device.

16. A method of providing security for industrial control systems of control devices communicating over a network comprising the steps of:
processing all incoming data from a first port using a hardware security component and with the hardware security component:
reviewing the incoming data against allowance data stored in a data table of the hardware security component,
identifying some incoming data as allowable,
forwarding the data identified as allowable to a second port,
identifying some incoming data as not allowable,
sending the data identified as not allowable to a software security component without forwarding the data to the second port; and
processing the data forwarded from the hardware security component using the software security component and with the software security component:
analyzing the incoming data to identify some incoming data as allowable,
forwarding the data identified as allowable to the second port without further intervention of the hardware security component,
identifying a portion of the data identified as allowable as requiring high speed processing,
updating the data table of the hardware security component with the portion of the data identified as allowable and requiring the high speed processing, identifying some incoming data as not allowable, and blocking the data identified as not allowable from the second port.

17. The method of claim 16 wherein the software security component communicates with a correspondent industrial control device to establish a network connection having a unique connection identification number and wherein the hardware security component reads connection identification numbers from the data table.

* * * * *